(12) United States Patent
Collins et al.

(10) Patent No.: US 10,198,161 B2
(45) Date of Patent: Feb. 5, 2019

(54) COMMUNICATING REACTIONS TO MEDIA CONTENT

(71) Applicant: Faysee Inc., Washington, DC (US)

(72) Inventors: Jonathan Collins, Boston, MA (US); Jesse Collins, Brookline, MA (US); Michael Sitchenko, New York, NY (US)

(73) Assignee: Faysee Inc., Washington, DC (US)

( * ) Notice: Subject to any disclaimer, the term of this patent is extended or adjusted under 35 U.S.C. 154(b) by 210 days.

(21) Appl. No.: 15/186,156

(22) Filed: Jun. 17, 2016

(65) Prior Publication Data

US 2016/0370975 A1  Dec. 22, 2016

Related U.S. Application Data

(60) Provisional application No. 62/181,649, filed on Jun. 18, 2015.

(51) Int. Cl.
| | |
|---|---|
| *H04N 5/765* | (2006.01) |
| *G06F 3/0484* | (2013.01) |
| *G06F 3/0482* | (2013.01) |
| *G06F 3/0481* | (2013.01) |
| *H04L 12/58* | (2006.01) |
| *G06F 3/0488* | (2013.01) |

(52) U.S. Cl.
CPC ........ *G06F 3/04842* (2013.01); *G06F 3/0482* (2013.01); *G06F 3/04817* (2013.01); *G06F 3/04883* (2013.01); *H04L 51/10* (2013.01)

(58) Field of Classification Search
CPC ................... G06Q 10/101; H04N 21/25891
USPC ......................... 715/765, 771, 763
See application file for complete search history.

(56) References Cited

U.S. PATENT DOCUMENTS

| | | | |
|---|---|---|---|
| 9,874,991 B2* | 1/2018 | Dunn | G06F 3/0481 |
| 2009/0235364 A1* | 9/2009 | Cohen | G06Q 10/101 726/28 |
| 2012/0324491 A1 | 12/2012 | Bathiche et al. | |
| 2013/0339433 A1 | 12/2013 | Li et al. | |
| 2014/0137144 A1* | 5/2014 | Jarvenpaa | H04N 21/25891 725/13 |
| 2015/0156543 A1* | 6/2015 | Allegretti | H04N 21/44218 725/12 |

OTHER PUBLICATIONS

Google, "Google Play—Reactions", Reactions—Android Apps on Google Play, retrieved from th Internet: https://play.google.com/store/apps/details?id=me.samba.app&hl=en[Jun. 8, 2016 4:47:19 PM], Jun. 8, 2016 (3 pages).

(Continued)

*Primary Examiner* — Cao H Nguyen
(74) *Attorney, Agent, or Firm* — Fish & Richardson P.C.

(57) ABSTRACT

A method of and system enabling asynchronous communication, whereby a message comprising an image or video is sent to one or more individuals or groups, a recipient of which is presented with the opportunity to capture an image, video, and/or auditory response, and to communicate that response to one or more of the sending individual, said one or more individuals or groups, or a second one or more individuals or groups.

22 Claims, 12 Drawing Sheets

Seen Message View  *1002*
Original Content Maximized
Thumbnails in order of first viewing
All thumbnails play simultaneously Seen Message View
Reaction Video Maximized and
Playing with its audio

(56) References Cited

OTHER PUBLICATIONS

Perez, Sarah, "Samba Offers a New Video Messaging App that Records Your Friend's Reactions", retrieved from the Internet on Jun. 8, 2016, http://techcrunch.com/2014/02/20/samba-offers-a-new-video-messaging . . . , article dated Feb. 20, 2014 (11 pages).
International Search Report and Written Opinion from corresponding PCT application PCT/US2016/038217 dated Sep. 8, 2016 (19 pages).

* cited by examiner

Message Feed View
Pixellated Thumbnails of Unseen
Original Content

600b

Unseen Message View
Pixellated Original Content
View and Record Button

600c

Seen Message View
Pixellated Original Content
Stop Recording and Send Button

600c

Message Feed View
Unpixellated Thumbnails for Viewed
Message
Recipient Thumbnails Show Who Has
Viewed Each Message

COMMUNICATING REACTIONS TO MEDIA CONTENT

CROSS-REFERENCE TO RELATED APPLICATION

This application claims the benefit of U.S. Provisional Application No. 62/181,649, filed Jun. 18, 2015, the contents of which are incorporated by reference herein.

TECHNICAL FIELD

This invention relates to electronic messaging, and more particularly to communicating reactions to media content.

BACKGROUND

People use electronic communication techniques to exchange information with each other. For example, some techniques allow people to send messages to one another, see whether or not the message has been received or viewed by the recipient. Further, some techniques enable the exchange of media items (e.g., images, video, audio, or combinations of these).

SUMMARY

A method of and system enabling asynchronous communication, whereby a message comprising an image or video is sent to one or more individuals or groups, a recipient of which is presented with the opportunity to capture an image, video, and/or auditory response, and to communicate that response in whole or in part to one or more of the sending individual, said one or more individuals or groups, or a second one or more individuals or groups. In some implementations, the method and system may inform the sender of a message as to whether the message has been received and/or viewed by at least one individual or group, and whether a response has been generated by said at least one individual or group. In some implementations, the method and system allows a message sender to simultaneously view one or more responses, may enable the sender to select one or more of said responses to be viewed more prominently than a second one or more of said responses, or both.

In some implementations, the method and system enables a recipient of a message to determine whether said recipient has viewed said message. If the recipient selects a message, the message is viewed. In some implementations, if a sender or recipient of a message has received a response to said message, a thumbnail of said response may be displayed to the sender or recipient. Said sender or recipient may select the thumbnail of said response for viewing.

In some implementations, the capture of a message or response is initiated by the press of a physical or other button. In some implementations, the capture of a message or response is initiated automatically by the method and system, for example via the detection of a face or a facial reaction.

In some implementations, multiple related received messages and replies are displayed in an order. Said order may be the order in which the messages and replies were received, the order in which the messages and replies were created, an order determined by one or more parameters such as facial properties captured in said messages and replies, or an order related to the quality of a recipient's facial or vocal response to a message or response.

In some implementations, characteristics of a recipient's response may initiate a monetary transaction.

The reaction communication that described in this document may encompass one or more of the following (and other) aspects, features, and implementations, and combinations of them.

In general, in an aspect, a method includes receiving, from a device, an electronic message that includes an image, presenting, on a display and in a user interface, a placeholder for the image, in response to determining that the placeholder should no longer be presented in the user interface, removing the placeholder from the user interface and presenting the image in the user interface, and while presenting the image in the user interface, causing storage of a reaction video in a memory.

In general, in an aspect, a method includes receiving a plurality of reaction videos that each indicate a reaction of a respective recipient to an image included in a message, analyzing, for each of the plurality of reaction videos, a parameter of the respective reaction video, and determining, for each of the plurality of reaction videos, a rank for the respective reaction video compared to the other reaction videos using the parameter of the respective reaction video.

In general, in an aspect, a method includes receiving, from a device, an electronic message that includes an image, presenting, in a message feed user interface prior to presenting the image in a user interface, an icon representing a type of the image that indicates the image is available for presentation without indicating specific content depicted in the image, presenting, on a display and in the user interface, a placeholder for the image in response to receipt of user input indicating selection of the icon representing the type of the image in the message feed user interface, receiving user input indicating selection of a menu option that requests removal of the placeholder and presentation of the image in the user interface, removing the placeholder from the user interface and present the image in the user interface in response to receiving the user input indicating selection of the menu option that requests removal of the placeholder and presentation of the image in the user interface, while presenting the image in the user interface, causing storage of a reaction video in a memory, presenting, in a message feed user interface after presenting the image in the user interface, a thumbnail of the image that indicates that content associated with the image is available for presentation in response to user input selecting the thumbnail of the image, receiving a plurality of second reaction videos that each indicate a reaction of a respective recipient to the image included in the electronic message, analyzing, for each of the plurality of second reaction videos, a parameter of the respective reaction video, determining, for each of the plurality of reaction videos, a rank for the respective reaction video compared to the other reaction videos using the parameter of the respective reaction video, and presenting, in the user interface, the second reaction videos according to the ranking and the image.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Implementations of this aspect may include one or more of the following features. Causing the storage of the reaction video in the memory may include receiving, from a camera, at least one of frame for the reaction, and providing each frame in the at least one frame to the server to cause the server to store the at least one frame in the memory. The method may include receiving user input indicating selection of a menu option that requests removal of the placeholder and presentation of the image in the user interface. Removing the placeholder from the user interface and presenting the image in the user interface may be responsive to receiving the user input indicating selection of the menu option that requests removal of the placeholder and presentation of the image in the user interface. Presenting, on the display and in the user interface, the placeholder for the image may include generating the placeholder using the image. Generating the placeholder using the image may include applying a blur effect to the image to generate the placeholder. Presenting, on the display and in the user interface, the placeholder for the image may include determining a type of the image, and selecting the placeholder using the type of the image. Determining a type of the image may include determining a type selected from a drawing, a photo, a video, an image of a gift, an image of funny content, or an image that includes audio content. The method may include presenting, in a message feed user interface prior to presenting the image in the user interface, an icon representing a type of the image that indicates the image is available for presentation without indicating specific content depicted in the image. The method may include presenting, in a message feed user interface after presenting the image in the user interface, a thumbnail of the image that indicates that content associated with the image is available for presentation in response to user input selecting the thumbnail of the image.

In some implementations, the method may include presenting, in a message feed user interface after presenting the image in the user interface, a thumbnail of the image that indicates that one or more additional reaction videos for the image are available for presentation in response to user input selecting the thumbnail of the image.

The method may include receiving a sequence of images from a camera, and analyzing each image in the sequence of images to determine whether a user of the computer system is facing the display that is presenting the user interface, wherein removing the placeholder from the user interface and presenting the image in the user interface is responsive to determining that multiple consecutive images in the sequence of images indicate that the user of the computer system is facing the display that is presenting the user interface. The method may include receiving user input indicating selection of a menu option that requests removal of the placeholder and presentation of the image in the user interface. Removing the placeholder from the user interface and presenting the image in the user interface may be responsive to receiving the user input indicating selection of the menu option that requests removal of the placeholder and presentation of the image in the user interface. The method may include analyzing one or more frames from the reaction video to determine whether the user of the computer system continues to face the display that is presenting the user interface, and in response to determining that the user of the computer system does not continue to face the display that is presenting the user interface, stopping the storage of the reaction video in the memory. Causing the storage of the reaction video in the memory may continue while the user of the computer system continues to face the display that is presenting the user interface. Analyzing each image in the sequence of images to determine whether the user of the computer system is facing the display that is presenting the user interface may include analyzing each image in the sequence of images to determine whether a face of the user captured in the respective image is approximately oval in shape. Analyzing each image in the sequence of images to determine whether the user of the computer system is facing the display that is presenting the user interface may include analyzing each image in the sequence of images to determine whether a face of the user captured in the respective image is approximately in a center of the image.

In some implementations, receiving the plurality of reaction videos that each indicate a reaction of a respective recipient to an image included in a message may include receiving the plurality of reaction videos that each indicate a reaction of a different recipient to a particular image included in a message, each of the particular images being the same. Receiving the plurality of reaction videos that each indicate a reaction of a respective recipient to an image included in a message may include receiving the plurality of reaction videos that each indicate a reaction of a particular recipient to a different image included in a message. The method may include determining, for each of the different images, a rank for the respective image compared to the other images using the parameter of the respective reaction video that indicates a reaction of the particular recipient to the respective image. Analyzing, for each of the plurality of reaction videos, the parameter of the respective reaction video may include determining, for each of the plurality of reaction videos, a largest smile size depicted in the respective reaction video. Determining, for each of the plurality of reaction videos, the rank for the respective reaction video compared to the other reaction videos using the parameter of the respective reaction video may include, determining, for each of the plurality of reaction videos, the rank for the respective reaction video using the largest smile size depicted in the respective reaction video. The method may include determining an average smile size using the largest smile sizes depicted in each of the reaction videos, and determining, for the image to which each of the plurality of reaction videos indicate a reaction of a respective recipient, a rank of the image compared to other images using the average smile size.

In some implementations, analyzing, for each of the plurality of reaction videos, the parameter of the respective reaction video may include determining, for each of the plurality of reaction videos, a duration of the respective reaction video. Determining, for each of the plurality of reaction videos, the rank for the respective reaction video compared to the other reaction videos using the parameter of the respective reaction video may include determining, for each of the plurality of reaction videos, the rank for the respective reaction video using the duration of the respective reaction video. Analyzing, for each of the plurality of reaction videos, the parameter of the respective reaction video may include determining, for each of the plurality of reaction videos, a duration of time for which a face depicted in the respective reaction video is directed toward a presentation of the image. Determining, for each of the plurality of reaction videos, the rank for the respective reaction video compared to the other reaction videos using the parameter of the respective reaction video may include determining, for each of the plurality of reaction videos, the rank for the respective reaction video using the duration of time for which a face depicted in the respective reaction video is directed toward a presentation of the image. Analyzing, for each of the plurality of reaction videos, the parameter of the respective reaction video may include determining, for each of the plurality of reaction videos, a laughter rating using frames in the respective reaction video that each depict the corresponding recipient laughing. Determining, for each of the plurality of reaction videos, the rank for the respective reaction video compared to the other reaction videos using the parameter of the respective reaction video may include determining, for each of the plurality of reaction videos, the rank for the respective reaction video using the laughter rating.

These and other aspects, features, and implementations, and combinations of them, may be expressed as apparatus, methods, methods of doing business, means or steps for performing functions, components, systems, program products, and in other ways.

The system may have one or more advantages. For example, the systems and methods described here may enable senders, recipients, or both, to assess quickly and accurately what content has been viewed, by whom, what the reactions of these recipients are, or a combination of two or more of these. In some implementations, the systems and methods described here may enable capture of a recipient's response to a message by a device, presentation of the response on another device, ranking of responses according to reaction parameters, or a combination of two or more of these. For instance, a system may analyze multiple reaction videos to determine a particular reaction parameter from multiple reaction parameters to use when ranking the multiple responses. In some implementations, a system may use facial and/or expression recognition techniques to evaluate the emotional response of one or more recipients of a message, may adjust the placement of the message or initiate a transaction based on the recognized emotional response, or both. In some implementations, the systems and methods described below may accurately track whether a message was presented to a recipient, store data in a database that indicates whether the message was presented to a recipient, provide the data that indicates whether the message was presented to a recipient, or a combination of two or more of these.

The details of one or more embodiments of the invention are set forth in the accompanying drawings and the description below. Other features, objects, and advantages of the invention will be apparent from the description and drawings, and from the claims.

DETAILED DESCRIPTION

Two people who are communicating electronically can send a media item (like a photo or video) to each other and also see their reactions to the media item. For example, the first person might send a photo to the second person, and then the first person can see the second person's reaction in the form of their facial expression. The manner in which the reactions are displayed can vary depending on the type of exchange the two people are having. For example, an exchange in which multiple media items are exchanged between two or more people may be suited to a particular arrangement of reactions, as described in further detail below.

The techniques described here include a system, including user interfaces and user interface components, for asynchronous video communication and recording and sharing video reactions to video and image content. Video or image messages can be sent to individual recipients, or to groups of recipients. The messages may appear in a message feed view. The recipients can select or click the message in the feed view to bring up the message view.

In some examples, a message may be created using a compose view, which is a user interface for composing the video, photo, drawing and/or text message. The system can take the form of a computer that hosts a website, executes an application, e.g., a smartphone application, or another system that executes an application with any appropriate computer interface with communication network and video recording capabilities to present a user interface as described in more detail below. The computer may be a user device, a server, or another appropriate type of computer.

The systems described herein enable a sender to receive accurate information on whether a message has been viewed by the recipient by recording and, in some implementations, processing/analyzing videos recorded by a front facing camera, e.g., included on a smartphone or similar device. The user interfaces described here may allow both senders and recipients to assess quickly and accurately what content has been viewed, by whom, what the reactions of these recipients are, or a combination of two or more of these. These systems may allow users to communicate asynchronously, in groups, and with video reactions, e.g., in addition to other means of communication, such as text, photo and video sharing.

The reaction videos may be processed/analyzed and resulting measured quantities may be used to rank content either publically, privately, or both. In some implementations, such analysis can be used to automate monetary transactions and charge users based on amount of attention paid to content, or for smiles or laughter or other reactions elicited in response to content, etc. In some examples, a system may use information on who has viewed certain content, e.g., in disputes of priority or plagiarism in creative fields of work.

Figure 1:
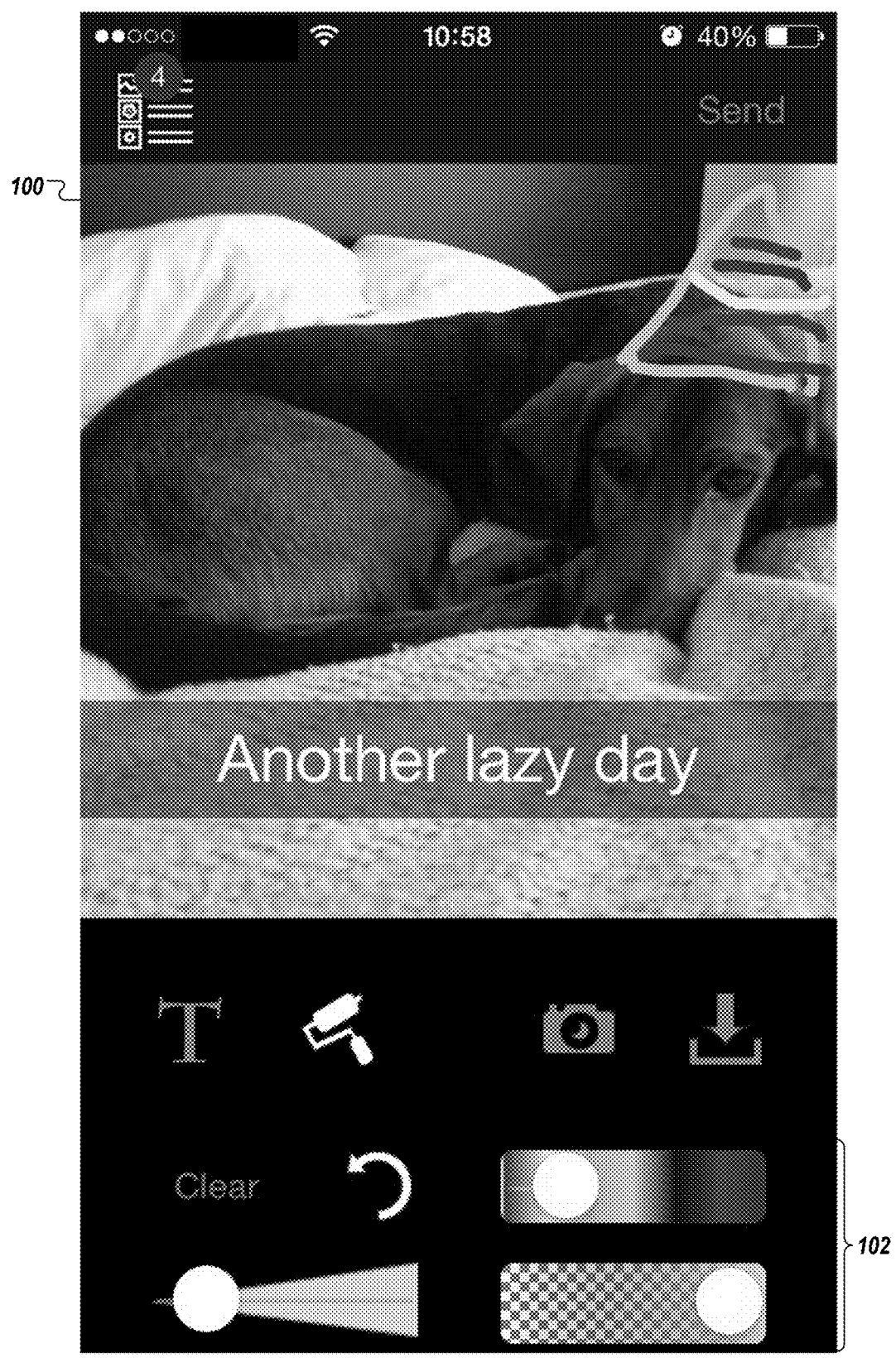
FIGS. 1-10 are views of user interfaces.

FIG. 1 shows an example of a compose view user interface 100. The compose view user interface 100 allows the user to take a photo or video. In some examples, the compose view user interface 100 may receive user input of a drawing. The compose view user interface 100 may allow user input of type text on top of any appropriate type of content, e.g., a photo, a video, or a drawing.

In some implementations, the compose view user interface 100 may include one or more sliders 102 whose properties convey the property they control. That is, a horizontal slider used for controlling text or drawing color is itself the spectrum of colors the user selected via sliding a circle along its length. Similarly, a size slider varies in size across its length, and the same for a transparency slider.

Figure 2:
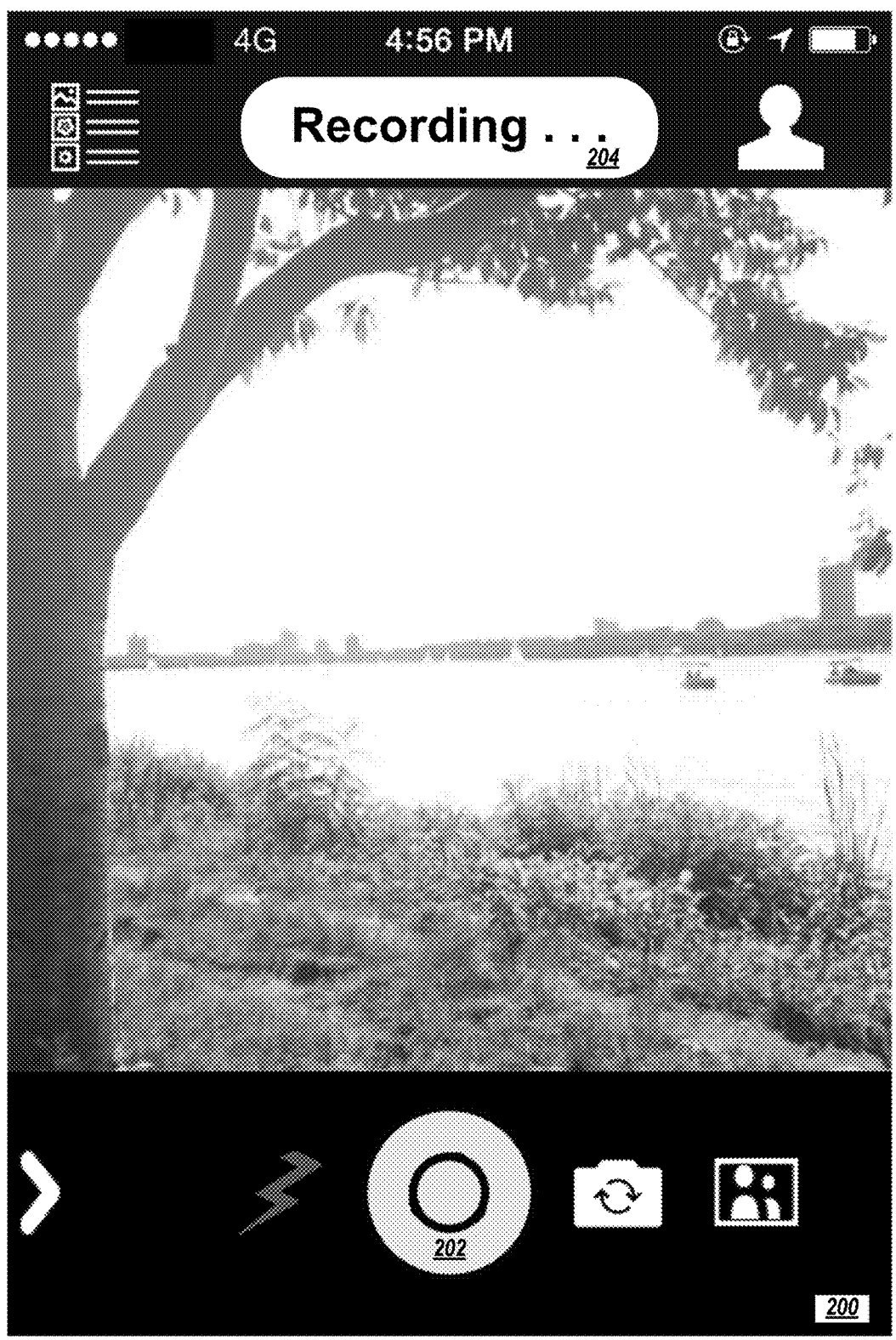
Figure 3:

FIGS. 2-3 show an example of a compose view user interface 200 that enables photo and video capture and editing. For instance, the compose view user interface 200 may allow user input selecting a record button 202. In response, a device that presents the compose view user interface 200 causes capture of a photo or video content. While recording the photo or video content, the device presents a recording message 204 indicating that the device is capturing the image content, e.g., using a camera integrated into or connected to the device.

The compose view user interface 200 may include a done recording message 306, shown in FIG. 3. Upon receipt of user input indicating selection of a menu option, e.g., the record button 202 or the done recording message 306, the device starts or stops capture of the media content, e.g., the photo, video or audio.

Figure 4:
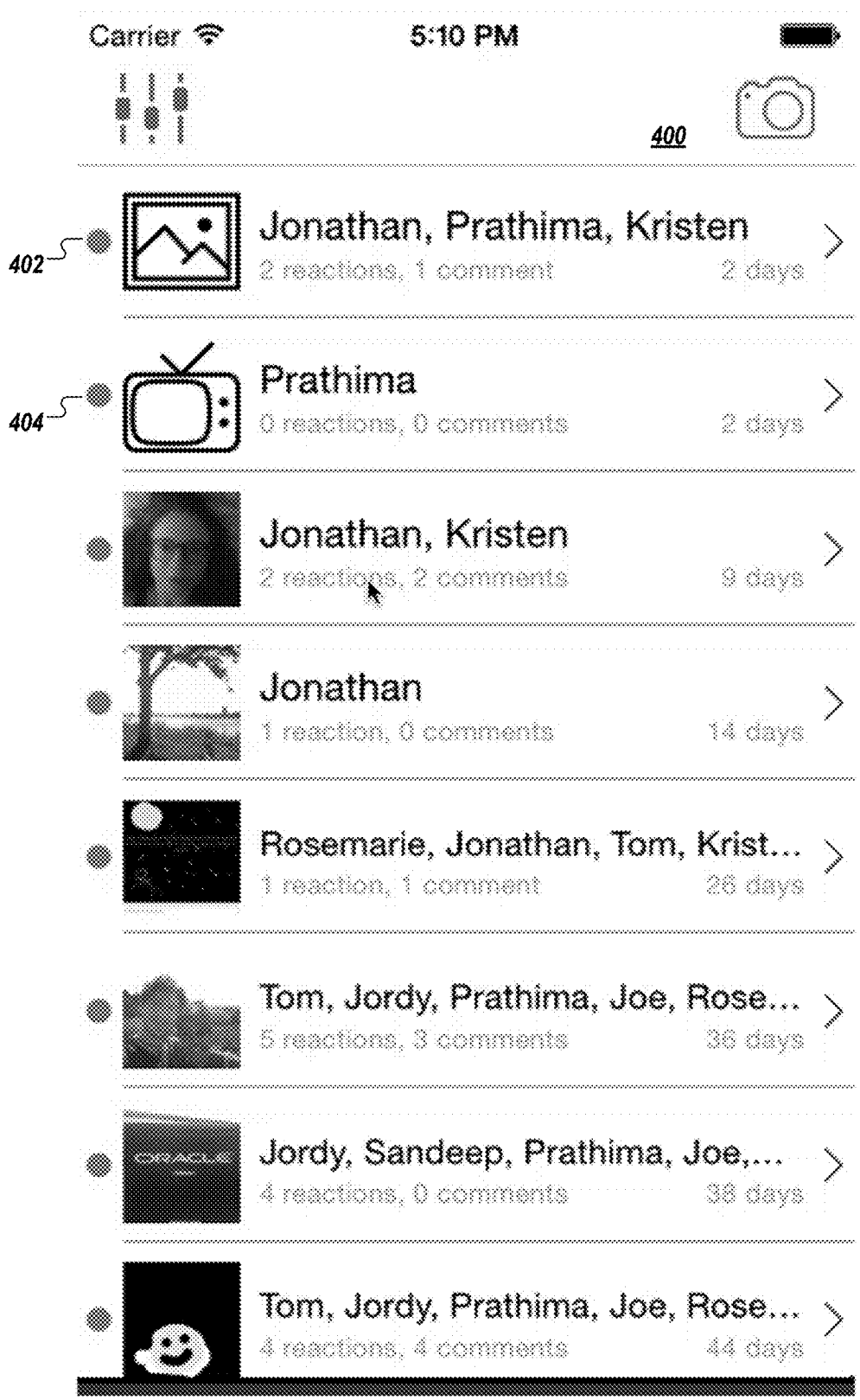

FIG. 4 is an example of a message feed view 400. The message feed view 400 may present some information about a message to prepare the recipient for viewing the message and original content of the message. The message feed view 400 may show an icon telling the recipient whether the message is a drawing, photo, or video. For example, an icon 402 of a landscape indicates to the recipient the content is a photo. An icon of a paint brush (not shown) indicates the content to be viewed is a drawing. An icon 404 of a TV indicates that the content is a video. Other icons could also help clue the recipient in on what they are about to view. In some implementations, sender-generated text may prepare the recipient for the main content. A gift box icon indicates a message of a gift or electronic gift card. Emoticons, such as laughing "smilies," prepare the recipient for e.g., viewing funny content, etc. In this way, a recipient can prepare to listen to the content if it is a video, e.g., by performing an action before viewing the content. For instance, the recipient may find a quiet location, increase speaker volume, and/or put on headphones to prepare for reacting to the audio as well as image content, etc.

FIGS. 5 and 6A-D are example message views. A system may generate different types of message views that present message content. For instance, a system may generate a message view using data that indicates whether the original content has been viewed by a recipient yet or not.

Figure 5:
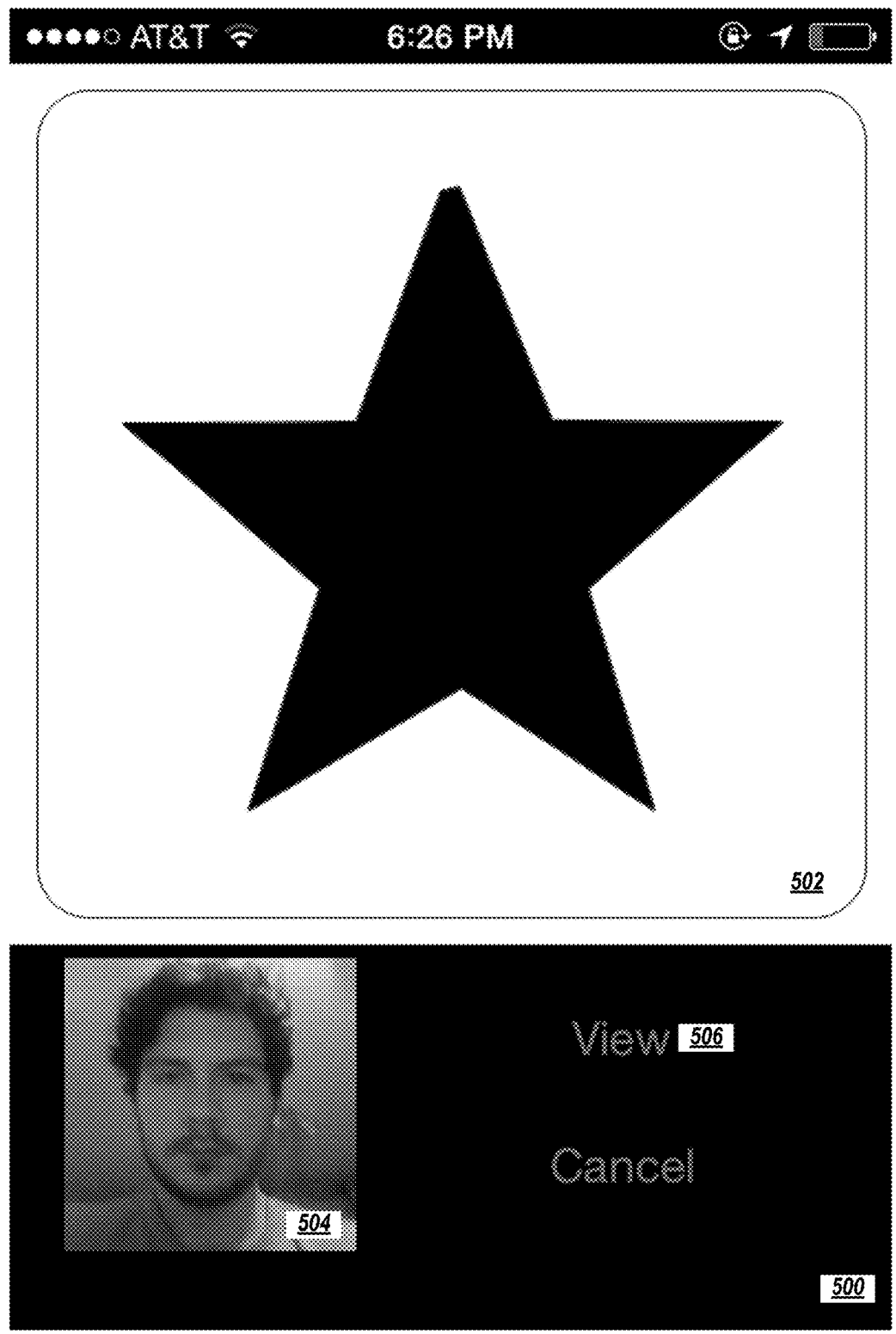
Figure 6A:
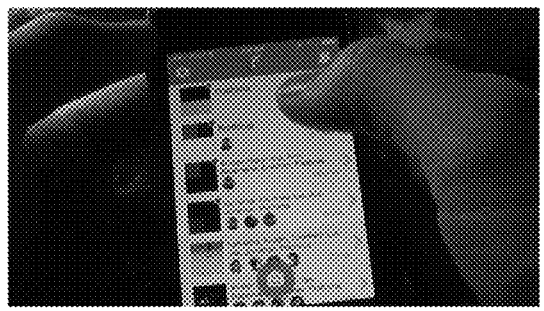
Figure 6B:

For example, when a system receives user input that indicates a recipient selecting a message in the message feed view, e.g., shown in FIG. 6A, the system may generate an unseen message view 500 and 600b that appears the first time the system displays that message to a recipient, e.g., as shown in FIGS. 5 and 6B.

The unseen message view includes a placeholder 502 where the image will appear, e.g., for presentation to the recipient. In some implementations, this placeholder is a simple icon, such as a star shown in FIG. 5. In some implementations, the placeholder is a blurred or pixelated version of the image, as shown in FIG. 6B, or a blurred or pixelated version of a first frame of the video. In some implementations, the placeholder is the live front camera stream, e.g., of the recipient, or a processed version of this live stream.

In some implementations, the unseen message view 500, 600b includes a video stream 504 from the device's camera, e.g., front camera, with the placeholder 502. In some implementations, this front camera video steam 504 is presented as a thumbnail below the placeholder. The video stream may be presented in any appropriate location of the unseen message view 500.

In some implementations, the start of the reaction is determined by user input. For instance, a device may begin recording a reaction upon receipt of user input indicating selection, e.g., pressing, of a menu option such as a "View and Record" button 506 shown in FIG. 5.

In some implementations, a device may perform face detection based on HAAR classification or similar to inform the recipient of whether or not their face is visible to the front camera. For example, the device may maintain the placeholder 502 in place unless a face is detected, e.g., in addition to or instead of selection of the view button 506. In this implementation, a device may determine the start of the reaction in part using user input, which initiates the attempt at face detection, and in part by the detection of the forward looking gaze of the recipient, e.g., as captured by a camera for the device.

Another user interface component of the unseen message view 500 (prior to viewing the message for the first time) is the "View and Record" button. This button could have text on it such as either "View" 506, "Record" or "View and Record." User input indicating a select or click of this button may cause a device to simultaneously display the message for the first time to the recipient and start recording a video stream of the recipient, e.g., using a front camera live video feed for the device. The device may generate a seen message view 600c shown in FIG. 6C, e.g., by changing the view from the Unseen Message View to the Seen Message View 1.

Figure 6C:
Figure 6D:
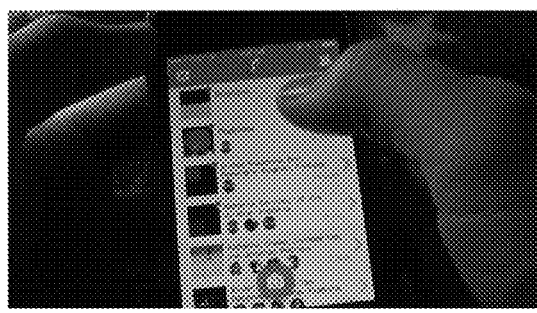

In some implementations, after receipt of the user input indicating the selecting or clicking this user interface component 506, the user interface component may change its functionality to "Stop Recording and Send," and the text on the user interface element may change accordingly. For instance, the user interface component may be labelled "Continue" as shown in FIG. 6C, or "Stop Recording." In some examples, the device may automatically stop recording a video stream of the recipient, e.g., after a predetermined period of time or based on analysis of facial images of the recipient.

The "stop recording and send" user interface component may allow the recipient to not just react, but add a response after their reaction or modify their reaction. For instance, the seen message view 600c may include a user interface element, presented after receipt of user input indicating selection of the "stop recording" option, that allows a user to enter a text message, edit content displayed in the message, e.g., to edit a photo, or perform another appropriate action. In this way, the system may enable asynchronous video communication.

The "stop recording and send" button, when selected/clicked, may both stop the recording from the device's camera and proceed with the next step of the process at the same time. In some implementations, the next step of the process is saving the video stream to the device, then sending the video stream to a server. In some implementations, the video reaction and response, e.g., the video stream, is streamed to the server while the device captures the video stream using a camera and user input indicating selection of the "stop recording" button stops the transmission of the video stream and saves the reaction and response on a server or other appropriate device, such as the recipient's device, directly.

After a message has been viewed, a message feed view 600d, 700 includes updated content for the message. For instance, the message feed view 600d, shown in FIG. 6D, may present the content from the message, a response to the message, e.g., captured by the device or by another device, or other appropriate content for the message.

Figure 7:
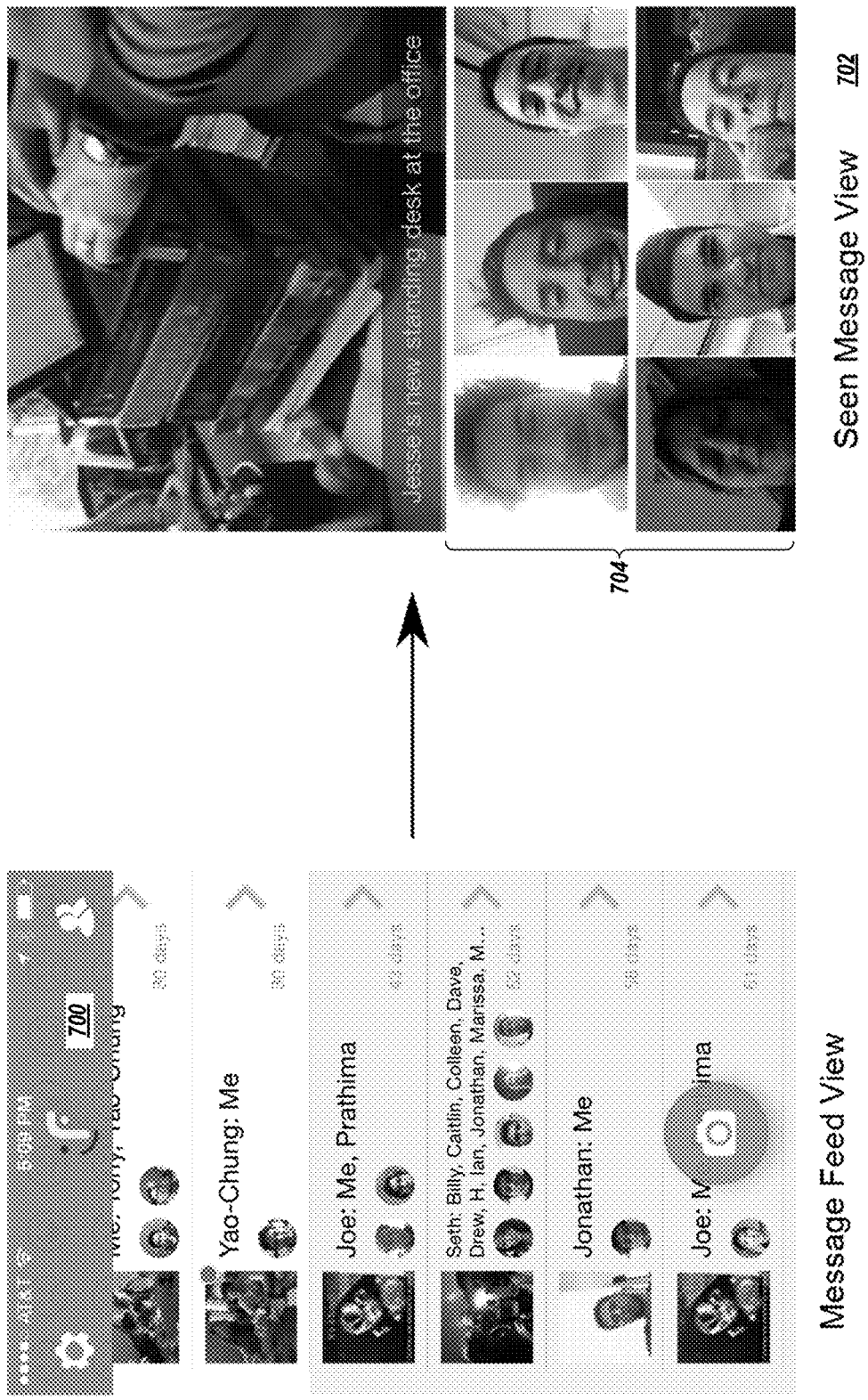

For instance, the message feed view 700, shown in FIG. 7, can include a menu option for the message. Upon receipt of user input indicating selection of the menu option, e.g., indicating user clicking or selecting of the message selected in the message feed view 700, then the original content is displayed again in a seen message view 702 along with any accompanying text and a collage of video responses, e.g., from recipients of the message. The seen message view 702 may present reaction video thumbnails 704 of the reaction videos below the original message content, e.g., in a dynamically adjustable collage. The seen message view 702 may present the reaction video thumbnails 704 in any appropriate location.

In some implementations, the reaction video thumbnails 704 are displayed in the order in which the recipients viewed the original content message. The thumbnail of the recipient who first viewed the content is displayed first, the thumbnail of the recipient who viewed the context next is displayed adjacent to the first, and so on. In some implementations, a quantity measured from the reaction videos is used to determine the order in which they are displayed. For example, the reaction video with the largest smile size is displayed first, then the reaction video with the next largest measured smile size is displayed adjacent to the first, and so on.

Figure 8:
Figure 9:
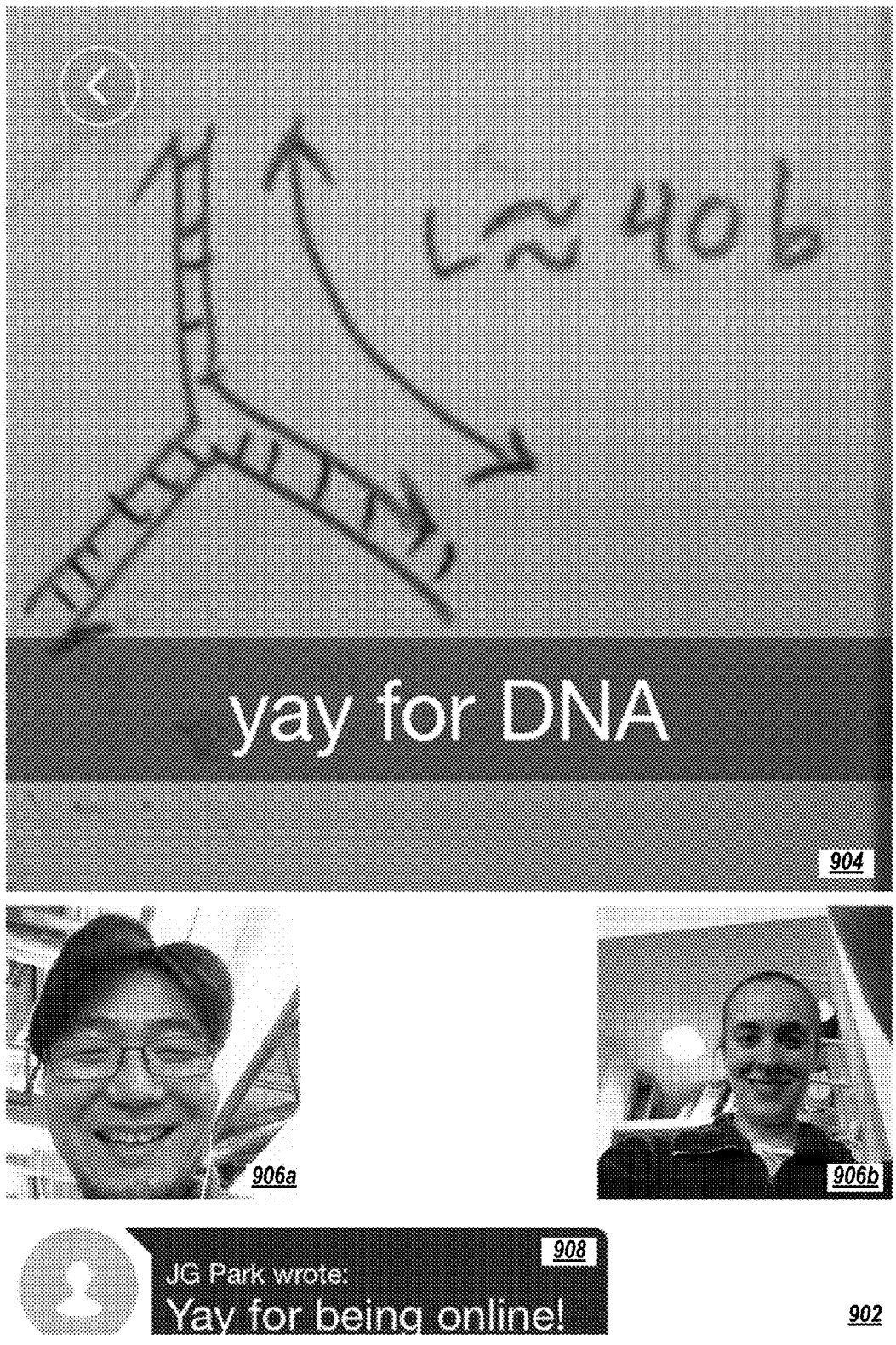

FIGS. 8-9 show additional seen message views 802, 902. For instance, the seen message view 802 shown in FIG. 8 includes a message 804, and multiple reaction video thumbnails 806a-e. For instance, the reaction video thumbnails 806a-e may be presented in an order. A first reaction video thumbnail 806a may have a highest order, a second reaction video thumbnail 806b may have a second highest order, and so on.

In some examples, a device may present the seen message view after presenting a message to a recipient. For instance, the device may present the unseen message view to a recipient, present a message to the recipient and capture a response video, and then present the seen message view to the recipient, e.g., without presenting a message feed view between presentation of the unseen message view and the seen message view.

The seen message view 902 shown in FIG. 9 includes a message 904 and multiple reaction video thumbnails 906a-b. The seen message view 902 includes a text message string 908 below the reaction video thumbnails 906a-b. The seen message view 902 may include the text message string 908 in any appropriate location, e.g., between the reaction video thumbnails 906a-b and the message 904 or above the message 904.

Returning to FIG. 7, the seen message view 702 may include any appropriate number of thumbnail reaction videos. In some examples, the seen message view 702 may include a scroll bar that allows user input to present additional reaction video thumbnails 704, e.g., in response to user input indicating a touch or scroll option to view additional reaction video thumbnails. In some implementations, the collage of thumbnails can scroll from top to bottom via a thumb swipe as in a rectangular smartphone held vertically in the hand. In some implementations, the collage view can scroll infinitely, or there can be an unlimited amount of rows.

In response to receipt of user input indicating selection of one of the reaction video thumbnails 704, e.g., user input selecting a thumbnail, the device may present the corresponding reaction video on a display. In some implementations, the device may present all of the thumbnail reaction videos the user has permission to view simultaneously.

In some implementations, the reaction video thumbnails 704 are displayed in rows with a predetermined number of thumbnails in each row, e.g., up to three or ten, with one selected reaction or the original content presented prominently in the user interface, e.g., taking up the width of the display. In some implementations, the reaction video thumbnails are sized to minimize whitespace, e.g. each of two total square reaction videos will be sized to a predetermined width approximately, such as one half or one third the width of the user interface, or if only one reaction video, it takes up maximum width, etc., as shown in the seen message view 702.

Figure 10:
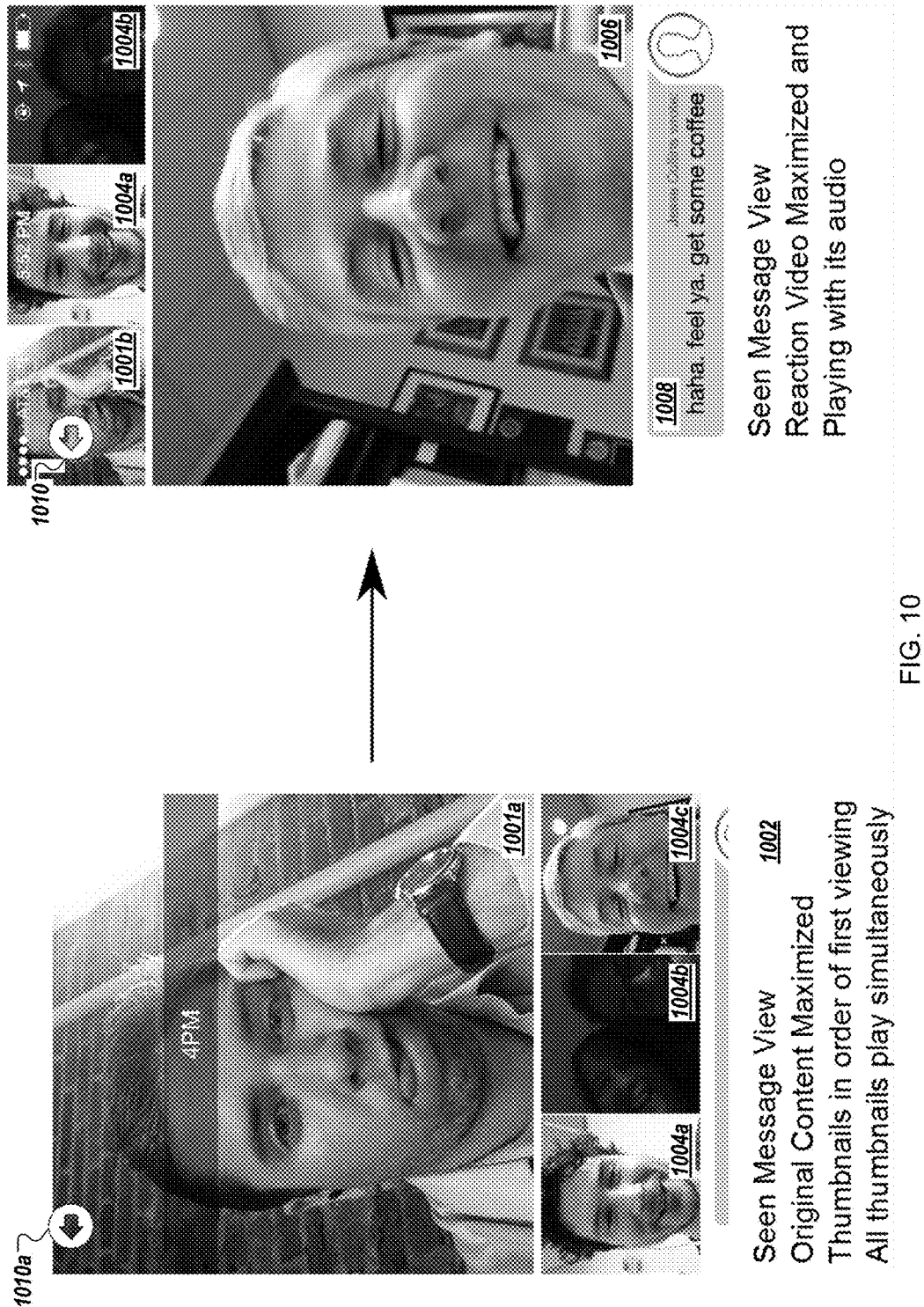

In some implementations, upon receipt of user input indicating selection, e.g., tapping, of any one reaction video thumbnails 704, the device expands presentation of the reaction video to the width of the view, e.g., the device's display or a width of a user interface, and plays that video, e.g., and the audio track associated with the selected reaction video. For instance, FIG. 10 shows an example of a seen message view user interface 1002 with an original message 1001a and multiple reaction video thumbnails 1004a-c. In response to receipt of user input indicating selection of a particular reaction video thumbnail 1004c, a device causes presentation of the corresponding reaction video 1006 prominently on a display. The device may present a thumbnail of the original message 1001b, thumbnails for additional reaction videos 1004a-b, or both, on the display. In some examples, the device may cause presentation of a corresponding message 1008 for the reaction video. In this way, the user can quickly get more detail about a single recipient's reaction.

A system may adjust the sizes, locations, or both, of the other videos or pictures, e.g., dynamically, in response to this user action. For instance, the device may move a position of one or more reaction video thumbnails 1004a-b in response to receipt of the user input.

In some examples, a device maintains the order in which the original message 1001 and the reaction videos are presented in the seen message view user interface 1002. For example, when the device receives user input indicating selection of a third reaction video 1004c, the device presents a thumbnail of the original message 1001b first, then presentation of the first two reaction videos 1004a-b, in the same order. The device presents the selected reaction video 1006 in an expanded view, e.g., so that the selected reaction video 1006 is easier to view.

When the device receives selection of a first reaction video 1004a, the device may reduce the size of the original message 1001a, place the reduced size original message 1001 at the top of the seen message view user interface 1002, e.g., spanning the entire top of the seen message view user interface with a reduced height and the same width, increase the size of the selected first reaction video 1004a to span the entire width of the seen message view user interface 1002, present the selected first reaction video 1004a prominently in the seen message view user interface 1002 directly below the reduced size original message 1001, and present additional reaction videos below the increased size selected first reaction video 1004a. The device may present only the second and third reaction videos 1004b-c below the increased size first reaction video 1004a. In some examples, the device may increase the width of one or both of the second and third reaction videos 1004b-c, e.g., to eliminate white space. The device may present the second and third reaction videos 1004b-c with a fourth reaction video.

In some implementations, a device may maintain an order of thumbnail reaction videos while presenting a selected reaction video prominently. For instance, in response to user input indicating selection of a reaction video, such as the first or the second reaction video, the device may present an increased size version of the selected reaction video, e.g., in the position of the selected reaction video 1006, while presenting a thumbnail of the original message 1001b and the other reaction videos, e.g., above or below the selected reaction video 1006. The device may present the first reaction video 1004a in the selected reaction video 1006 position while presenting thumbnails for the original message 1001b, then a thumbnail for the second reaction video 1004b, and then a thumbnail for the third reaction video 1004c.

The device may dynamically change the order based on which reaction video is selected to maintain the ranking of the reaction videos as much as possible. For instance, if the device receives user input indicating selection of the second reaction video 1004b after selection and presentation of the first reaction video 1004a, the device may present the second reaction video 1004b prominently, e.g., as the selected reaction video 1006, with thumbnails for the original content 1001b, the first reaction video 1004a, and then the third reaction video 1004c, e.g., in that order.

In some implementations, a device may maintain a position of a selected reaction video in a sequence of reaction videos. For example, in response to selection of the second reaction video 1004b, the device may include a block of white space in the location previously occupied by the section reaction video 1004b while presenting the second reaction video 1004b as the selected reaction video 1006, e.g., while presenting the second reaction video 1004b prominently in the seen message view user interface 1002. In some examples, the device may present the thumbnail of the original message 1006b in the position previously occupied by the thumbnail of the second reaction video 1004b, e.g., the device may switch the positions of the original message 1001a and the second reaction video 1004b.

In some implementations, a device may adjust a size of one or more reaction videos to reduce or eliminate presentation of white space in a user interface. In some examples, a device may present white space in a user interface, e.g., as a placeholder for a currently presented reaction video, because of a number of reaction videos for a message, or both.

In some implementations, one or more of the other reaction videos may play simultaneously in thumbnail form. For instance, a device may present the reaction videos 1004a-c in the seen message view user interface 1002 while the messages are playing and allow user input indicating selection of one of the playing reaction videos 1004a-c to cause a prominent presentation of the selected reaction video, e.g., in the position of the selected reaction video 1006 or the original message 1001a. After presentation of the original message 1001a, the device may automatically present the seen message view user interface with the reaction videos, e.g., that were included in the unseen message view user interface with the placeholder.

In some examples, a device may include reaction videos in an unseen message view user interface, e.g., 500 or 600b. For instance, the device may present the reaction videos with a placeholder, e.g., 502, to allow a recipient to view the reaction videos before viewing the original message 1001a. The device may, in the unseen message view user interface, play one or more of the reaction videos in a thumbnail form.

The device may allow selection and viewing of any number of thumbnail reactions. The device may present text comments before, during, or after presentation of reaction videos. For instance, the device may present a particular reaction video at the same time as presentation of a text message from the person depicted in the reaction video. In some examples, the device may present text messages following presentation of the series of reaction videos, e.g., in thumbnail form or in an expanded view. In some example, the device may allow scrolling of a portion of the seen message view user interface 1002 while the videos continue to play, e.g., in response to selection of a scroll button 1010.

Returning to FIG. 7, the scrollable message feed in the seen message view 702 may display reaction video thumbnails 704 from reaction videos with a message. These thumbnails may indicate which recipients have viewed the message. For instance, the reaction video thumbnails may have a square shape, e.g., to allow for the best framing of faces in reaction videos and packing on a screen so that the user can scroll through many reactions, with one to three reaction videos appearing in each row on the view. In some implementations, the order of the thumbnails is the same as the order in which the recipients viewed the message.

In some implementations, the order of the reaction video thumbnails 704 is the order in which the recipients responded most positively, e.g., as measured by maximum smile size, smile size integrated over the course of their reaction video, or other similar measurement. In some implementations, the reaction video thumbnails 704 are still images, such the first frame of the reaction video, the last frame of the reaction video, or the frame with maximum smile size or maximum expression of surprise, etc. In some examples, the videos for the reaction video thumbnails 704 may play even if the user scrolls to reveal additional reaction videos. In some implementations, the reaction video thumbnails 704 may be selected and then maximize from the message feed view or may be selected to take the user to the seen message view with that particular thumbnail maximized and playing, e.g., along with an audio track for the corresponding reaction video.

In some implementations, when a device presents an unseen message view, the device may display the original content of the message if and only if a face is detected in a camera feed, e.g., a front facing camera feed for the device. In some implementations, the device may display the original content if the face is additionally recognized as the intended recipient of the message. For instance, the device captures an image of the user of the device using a camera, and performs an appropriate face recognition process to determine whether the user is the intended recipient, e.g., an owner of the device. When the device determines that the user is the intended recipient, the device displays the original content of the message. When the device determines that the user is not the intended recipient, the device does not display the original content of the message, e.g., and displays a placeholder instead of the original content. In some implementations, the device may use other biometric data such as retinal scans or thumbprints to determine whether the user of the device is the intended recipient and display the original content if and only if the biometric data are measured and verified to correspond to the intended recipient.

In some implementations, at least one frame of the recipient's front camera video is processed/analyzed computationally. In some examples, a system displays the original content if and only if a face is detected. If the face is not detected, the system displays a placeholder, such as a white square, generic icon, blurred or pixelated version of the original content if the face is not detected.

In some implementations, a device analyzes a reaction video to determine a parameter of a frame in the video. For instance, the device may analyze the frames from the reaction video to select the frame that maximizes some parameter, such as smile size, a mouth wideness, or an eye wideness. The device may cause the selected frame to be saved, e.g., in a memory of the device, in a memory of a server, or both. The device or the server may use the selected frame to rank the reaction video, the original content of a message, or both, or to display the selected frame to the sender of the message or other recipients of the message. In some examples, the device may use HAAR classifiers to analyze the face, mouth, or eyes. A device or a server may average smile size over multiple recipients when determining a ranking for the original content of a message. In some examples, a device or a server may use averaged smile size to rank original content of a message for public consumption, e.g., in which users other than the recipients have access to the original content, for private consumption, e.g., in which only the recipients of the message that includes the original content have access to the original content, or both.

A system, e.g., a device or a server, may use rankings of original content according to measured quantities to arrange original content both for public and private consumption. For example, a system may average maximum smile size over all the viewers of original content. The system may use the average smile size to rank and display original content of multiple messages in order of biggest smile generated on average, publically on a website. In some implementations, a device may present a message feed view in which the messages, and corresponding original content, are ranked by the largest smile. For instance, the ranking may be of an average smile size of all viewers of the original content, a smile size of a user of the device when viewing the corresponding content, or another appropriate parameter.

In some implementations, a system may use measured quantities to automatically charge money in a transaction between the provider of the original content and the recipients of the content. In some implementations, a comedian provides content and his/her recipients are debited money into the comedian's account based on measured quantities such as integrated smile size, laughter, etc. In some implementations, a system determines a measure of the user's attention with respect to the original content. A system may automatically cause payment to a content provider from the recipient's account in proportion to the amount of time the recipient is paying attention to the content. A system may use an amount of time the recipient spends viewing the content, e.g. how much time their forward-facing face or gaze is detected while the original content is displayed, as a measure of the user's attention with respect to the original content.

Table 1, below, includes example pseudocode for recording a reaction video if and only if a face is detected.

TABLE 1

Display a placeholder in a user interface
For each live video frame received from a camera:
    Determine if any faces exist in the video frame via HAAR
    cascade classification
    If a face is detected in the video frame:
        Remove the placeholder from the user interface and display
        original content in the user interface
        Store the video frame (and optionally corresponding audio) in a
        memory of a device or a server (e.g., via asynchronous
        JavaScript ™)
    If a face is not detected in the video frame:
        Display a placeholder in the user interface
        If original content is a video, save current media position
        Do not store a frame from the camera Table 2, below, includes example pseudocode for face detection and smile size measurement.

TABLE 2

Display a placeholder in a user interface
maximum smile size = 0

TABLE 2-continued

For each video frame received from a camera:
    Determine if any faces exist in the video frame via HAAR
    cascade classification
    If a face is detected in the video frame:
        Remove the placeholder from the user interface and display
        original content in the user interface
        Detect a mouth region in the video frame and segment the
        mouth region (e.g., with general geometric parameters or
        via personalized algorithms)
        Run FAST corners on each mouth segment in the mouth region
        to determine a number corners for the mouth segment
        If corners counted > maximum smile size
                Store the video frame in a memory of a device or
                a server (e.g., via asynchronous JavaScript ™)
        maximum smile size = corners counted
    If a face is not detected in the video frame:
        Display a placeholder in the user interface
        If original content is a video, save current media position
        Do not store a frame from the camera A system may be implemented using any appropriate combination of software and hardware. For example, the software package JSFeat (http://inspirit.github.io/jsfeat/) can be used for computer vision functionality, including HAAR face detection. Another package that can be used for computer vision is OpenCV (http://opencv.org/) The CRPixellatedView algorithm (https://github.com/chroman/CRPixellatedView) can be used for pixellation. In some implementations, any of the steps described above with respect to a device, e.g., a user device, or a server may be performed by another component of a system. For instance, any step described with reference to a device may be performed by a server and any step descripted with reference to a server may be performed by a device. In some examples, a particular step may be performed by a combination of components from a system. For example, a device may capture a reaction video and a server may analyze the reaction video to select a frame for a measurement of the reaction video. The server may use the frame to rank reaction videos for particular original content in a message and to generate a seen message user interface that includes thumbnails for the ranked reaction videos. The server may provide instructions for presentation of the seen message user interface to the device or a different device to cause the device to present the seen message user interface, e.g., to a user of the respective device.

Figure 11:
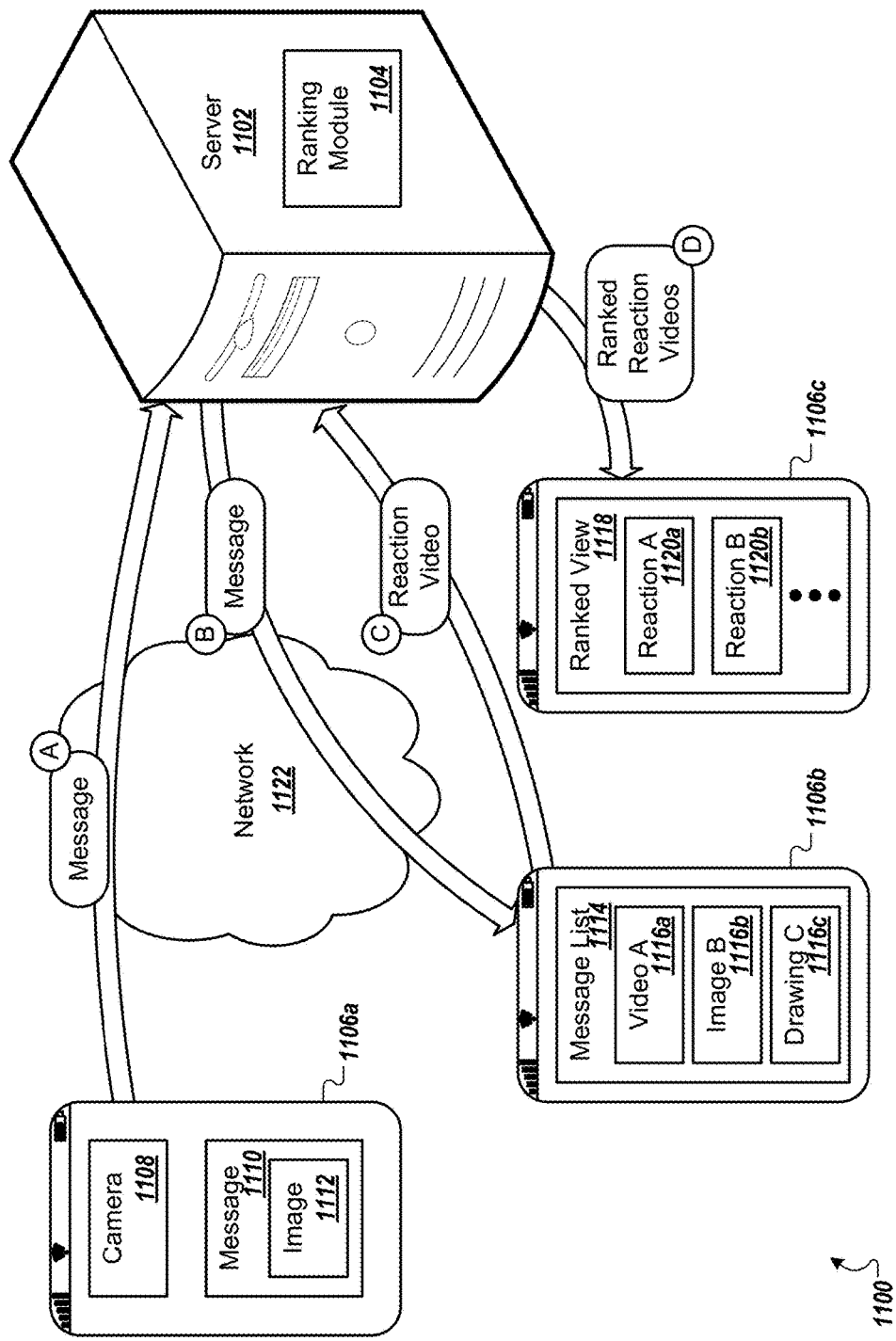
FIG. 11 is an example system for communicating reactions to media content.

FIG. 11 is an example system 1100 for communicating reactions to media content. The system includes a server 1102 that receives a message 1110, at time $T_A$, from a first user device 1106a and provides the message, during time period $T_B$, to other user devices 1106b-c. For instance, the first user device 1106a includes a camera 1108 that captures an image 1112, e.g., of a user of the first user device 1106a or other content. The first user device 1106a creates a message 1110 that includes the image 1112, e.g., in response to user input specifying content for the message.

The server 1102 receives the message 1110, at time TA, from the first user device 1106a. The server 1102 determines recipient devices for the message 1110. For instance, the server 1102 uses content from the message, e.g., a "To" header, data for the first user device 1106a, e.g., an account for the first user device 1106a, or other appropriate data to determine the recipient devices.

The server 1102 sends the message 1110, during time TB, to each of the recipient devices 1106b-c. For example, the server 1102 sends the message 1110 to a second user device 1106b and separately sends the message 1110 to a third user device 1106*c*. The server 1102 may send a modified message to the recipient devices 1106*b-c*. For instance, the server 1102 may format the message specifically for the particular recipient device that is receiving the message as long as the data received by the recipient device includes the image 1112, e.g., and other additional content specified in the original message 1110 received from the first user device 1106*a* such as a text note for presentation with the image 1112.

The second user device 1106*b* receives the message and the image 1112 from the server and presents content in a message list user interface 1114. For instance, the message list user interface may include data for multiple messages that have been presented, e.g., and are seen, have not been presented, e.g., and are unseen, or both.

The second user device 1106*b* may determine a type of content included in the message and present the type of content in the message list user interface 1114. For example, the second user device 1106*b* may determine whether the image is a first frame in a video, a still image, or a drawing, among other appropriate message types, e.g., text messages, etc.

When the second user device 1106*b* determines that the image 1112 is a first frame in a video, when the second user device 1106*b* received the video from the server 1102 as part of the message, the second user device 1106*b* presents an icon that indicates the message type, such as an icon for a video A 1116*a*. The second user device 1106*b* may present any appropriate type of information in the message list user interface 1114 that indicates content is available for presentation on a display of the second user device 1106*b*.

The message list user interface 1114 may include additional options for an image B 1116*b*, e.g., a still image, a drawing C 1116*c*. The second user device 1106*b* may have presented the image B 1116*b*, the drawing C 1116*c*, or both, e.g., and may display appropriate information in the message list user interface 1114 that indicates whether the corresponding content has been presented, such as a thumbnail of the presented content.

The second user device 1106*b* receives user input indicating selection of the video A 1116*a*. In response, the second user device 1106*b* presents the image 1112 and captures a reaction video, e.g., using a camera included in the second user device 1106*b*. The second user device 1106*b*, at time Tc, sends the reaction video to the server 1102.

The server 1102 uses the reaction video, and reaction videos for the image 1112 received from other user devices, such as the third user device 1106*c*, to determine a ranking of the reaction videos, e.g., as described in more detail above. The server 1102 may use a ranking module 1104 to determine the ranking of the reaction videos, e.g., using a reaction parameter of each of the reaction videos. Some examples of reaction parameters may include whether a face depicted in a reaction video includes a smile, a duration for which a face depicted in a reaction video is smiling, whether a face depicted in a reaction video includes a laugh, a size of a smile depicted in a reaction video, e.g., a largest smile or a smallest smile, a number of teeth shown in a smile depicted in a reaction video, a duration of laughing recorded in a reaction video, e.g., a laughter rating, a number of teeth shown while a face depicted in a reaction video is laughing, an average smile size of a face depicted in a reaction video, an amplitude of noise in a reaction video, a duration of the reaction video, a duration for which a face in the reaction video is facing forward, e.g., facing a camera that captured the reaction video or a display presenting the message, a name of a person depicted in a reaction video, a time at which the reaction video was captured, e.g., the start time, the end time, or an average, or a combination of two or more of these. In some examples, the amplitude may be of a person talking in a reaction video. In some examples, the amplitude may be a difference between a laughter amplitude and an amplitude of other sound in the reaction video. For instance, the amplitude may be a difference between a highest, average, or lowest laughter amplitude in the reaction video and a highest, average, or lowest amplitude of speech in the reaction video. In some examples, the amplitude may be a speech amplitude of utterances spoken in the reaction video, e.g., a highest amplitude, an average amplitude, or a lowest amplitude.

In some implementations, when a reaction video includes multiple faces, the server 1102 may use a combination of one or more of the above reaction parameters for each of the individual faces and combine a value to determine an overall parameter value for the reaction video. For instance, when a reaction video includes two faces, e.g., for all or part of the reaction video, the server 1102 may determine an average smile shown in each of the faces and use the largest average smile or an average of the two average smiles as the reaction parameter for ranking the reaction video.

The server 1102 provides the ranking, during time period TD, to the third user device 1106*c*. During time period TD, the server 1102 may provide one or more of the ranked reaction videos to the third user device 1106*c*. For instance, the server 1102 may determine that a third reaction video is already included in a memory of the third user device 1106*c* and provide the other reaction videos for the image 1112 to the third user device 1106*c* excluding the third reaction video.

The third user device 1106*c* using the ranking received from the server 1102 to present a ranked view user interface 1118 of the reaction videos for the image 1112. The ranked view user interface 1118 includes multiple reaction videos 1120*a-b* for the image 1112. In some examples, the ranked view user interface 1118 may include a presentation of the image 1112, e.g., as described above. The ranked view user interface 1118 might not include a reaction video generated by the third user device 1106*c*, e.g., the third reaction video. The ranked view user interface 1118 allows user input indicating selection of one of the reaction videos to cause presentation of the selected reaction video.

In some implementations, the ranked view user interface 1118 may present multiple reaction videos at the same time. For instance, the ranked view user interface may initially present thumbnails for all of the ranked reaction videos, e.g., depending on space available in the user interface. In response to user input indicating a selection of a "play" option, the third user device 1106*c* may cause playback of all of the reaction videos at substantially the same time. For example, the third user device 1106*c* may initiate playback of all of the reaction videos at the same time. The third user device 1106*c* may stop playback of some of the reaction videos before ending playback of other reaction videos, e.g., when a reaction video A 1120*a* is shorter than a reaction video B 1120*b*, playback of the reaction video A 1120*a* stops before ending of playback of the reaction video B 1120*b*.

In some implementations, one or more of the user devices 1106*a-c* may include the ranking module 1104. For instance, the first user device 1106*a* may include the ranking module 1104 and receive a respective reaction video from each of the recipient user devices 1106*b-c*. The first user device 1106*a* ranks the reaction videos, as described above, and provides the ranked reaction videos to the recipient user devices 1106*b-c*.

The user devices 1106*a-c* may include personal computers, mobile communication devices, and other devices that can send and receive data over a network 1122. The network 1122, such as a local area network (LAN), wide area network (WAN), the Internet, or a combination thereof, connects the server 1102, and the user devices 1106*a-c*.

Figure 12:
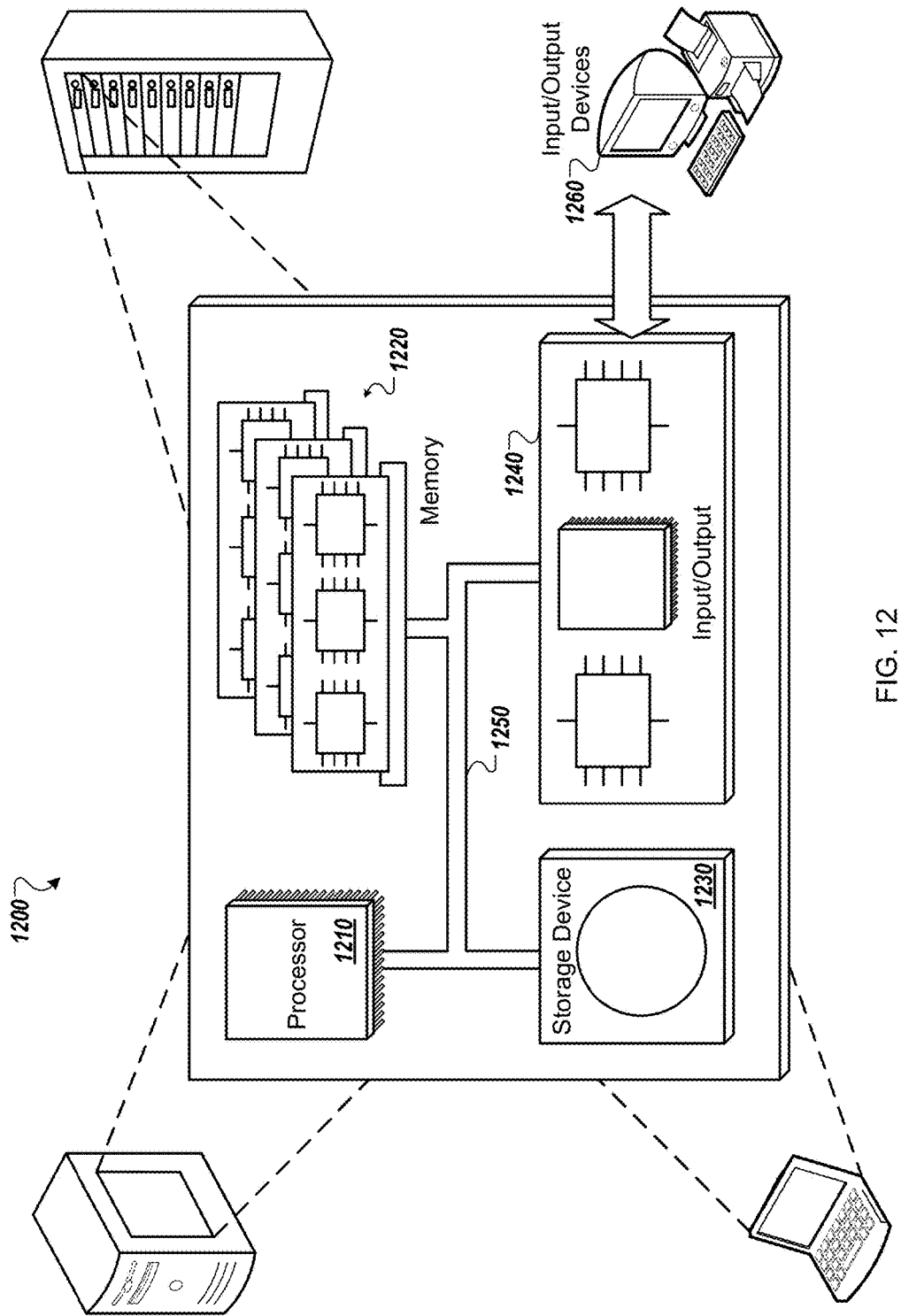
FIG. 12 is a block diagram of an example computer system.

FIG. 12 is a block diagram of an example computer system 1200. For example, referring to FIG. 11, the server 1102, the user devices 1106*a-c*, or both, could be an example of the system 1200 described here, as could a computer system used by any of the users who access resources of the server 1102 as shown in FIG. 11. The system 1200 includes a processor 1210, a memory 1220, a storage device 1230, and one or more input/output interface devices 1240. Each of the components 1210, 1220, 1230, and 1240 can be interconnected, for example, using a system bus 1250.

The processor 1210 is capable of processing instructions for execution within the system 1200. The term "execution" as used here refers to a technique in which program code causes a processor to carry out one or more processor instructions. In some implementations, the processor 1210 is a single-threaded processor. In some implementations, the processor 1210 is a multi-threaded processor. In some implementations, the processor 1210 is a quantum computer. The processor 1210 is capable of processing instructions stored in the memory 1220 or on the storage device 1230. The processor 1210 may execute operations such as generation, ranking, or both, of reaction videos.

The memory 1220 stores information within the system 1200. In some implementations, the memory 1220 is a computer-readable medium. In some implementations, the memory 1220 is a volatile memory unit. In some implementations, the memory 1220 is a non-volatile memory unit.

The storage device 1230 is capable of providing mass storage for the system 1200. In some implementations, the storage device 1230 is a non-transitory computer-readable medium. In various different implementations, the storage device 1230 can include, for example, a hard disk device, an optical disk device, a solid-state drive, a flash drive, magnetic tape, or some other large capacity storage device. In some implementations, the storage device 1230 may be a cloud storage device, e.g., a logical storage device including one or more physical storage devices distributed on a network and accessed using a network, such as the network 1122 shown in FIG. 11. In some examples, the storage device may store long-term data, such as the image 1112, the reaction videos, or both, as shown in FIG. 11. The input/output interface devices 1240 provide input/output operations for the system 1200. In some implementations, the input/output interface devices 1240 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, etc. A network interface device allows the system 1200 to communicate, for example, transmit and receive data such as the message, the reaction videos, or both, as shown in FIG. 11, e.g., using the network 1122 shown in FIG. 11. In some implementations, the input/output device can include driver devices configured to receive input data and send output data to other input/output devices, e.g., keyboard, printer and display devices 1260. In some implementations, mobile computing devices, mobile communication devices, and other devices can be used.

Referring to FIG. 11, the ranking module 1104 can be realized by instructions that upon execution cause one or more processing devices to carry out the processes and functions described above, for example, rank reaction videos. Such instructions can include, for example, interpreted instructions such as script instructions, or executable code, or other instructions stored in a computer readable medium.

A server 1102 as shown in FIG. 11 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 1200 is contained within a single integrated circuit package. A system 1200 of this kind, in which both a processor 1210 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 1240.

Although an example processing system has been described in FIG. 12, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as storing, maintaining, and displaying artifacts can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry. Sometimes a server (e.g., the server 1102 as shown in FIG. 11) is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network such as the network 1122 shown in FIG. 11. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

A number of embodiments of the invention have been described. Nevertheless, it will be understood that various modifications may be made without departing from the spirit and scope of the invention. Accordingly, other embodiments are within the scope of the following claims.

What is claimed is:

1. A non-transitory computer readable storage device storing a computer program product comprising machine-readable instructions that, when executed, cause a computer system to carry out operations comprising:
receiving, from a device, an electronic message that includes an image;
presenting, on a display and in a user interface, a placeholder for the image;
in response to determining to remove the placeholder from the user interface, removing the placeholder from the user interface and presenting the image in the user interface;
while presenting the image in the user interface, causing storage of a reaction video in a memory;
receiving data for one or more additional reaction videos, each of the one or more additional reaction videos including a reaction captured by a different device upon presentation of the image;
presenting, in a message feed user interface after presenting the image in the user interface, a thumbnail of the image that indicates that two or more reaction videos for the image are available for presentation, the two or more reaction videos including the reaction video and the one or more additional reaction videos; and
presenting, in response to user input selecting the thumbnail of the image, a message seen user interface that includes two or more different images, each different image associated with a respective one of the two or more reaction videos.

2. The computer readable storage device of claim 1, the operations comprising:
receiving user input indicating selection of a menu option that requests removal of the placeholder and presentation of the image in the user interface, wherein removing the placeholder from the user interface and presenting the image in the user interface is responsive to receiving the user input indicating selection of the menu option that requests removal of the placeholder and presentation of the image in the user interface.

3. The computer readable storage device of claim 1, wherein presenting, on the display and in the user interface, the placeholder for the image comprises:
generating the placeholder using the image.

4. The computer readable storage device of claim 3, wherein generating the placeholder using the image comprises applying a blur effect to the image to generate the placeholder.

5. The computer readable storage device of claim 1, wherein presenting, on the display and in the user interface, the placeholder for the image comprises:
determining a type of the image; and
selecting the placeholder using the type of the image.

6. The computer readable storage device of claim 1, the operations comprising:
presenting, in a message feed user interface prior to presenting the image in the user interface, an icon representing a type of the image that indicates the image is available for presentation without indicating specific content depicted in the image.

7. The computer readable storage device of claim 1, the operations comprising:
receiving a sequence of images from a camera; and
analyzing each image in the sequence of images to determine whether a user of the computer system is facing the display that is presenting the user interface, wherein removing the placeholder from the user interface and presenting the image in the user interface is responsive to determining that multiple consecutive images in the sequence of images indicate that the user of the computer system is facing the display that is presenting the user interface.

8. The computer readable storage device of claim 7, the operations comprising:
receiving user input indicating selection of a menu option that requests removal of the placeholder and presentation of the image in the user interface, wherein removing the placeholder from the user interface and presenting the image in the user interface is responsive to receiving the user input indicating selection of the menu option that requests removal of the placeholder and presentation of the image in the user interface.

9. The computer readable storage device of claim 7, the operations comprising:
  analyzing one or more frames from the reaction video to determine whether the user of the computer system continues to face the display that is presenting the user interface; and
  in response to determining that the user of the computer system does not continue to face the display that is presenting the user interface, stopping the storage of the reaction video in the memory, wherein causing the storage of the reaction video in the memory continues while the user of the computer system continues to face the display that is presenting the user interface.

10. The computer readable storage device of claim 1, the operations comprising:
  presenting, in response to user input indicating selection of one of the two or more different images, the respective one of the one or more additional reaction videos.

11. The computer readable storage device of claim 1, the operations comprising:
  presenting, in the message feed user interface, a second thumbnail of a second image associated with a second electronic message that is different than the electronic message.

12. A non-transitory computer readable storage device storing a computer program product comprising machine-readable instructions that, when executed, cause a computer system to carry out operations comprising:
  receiving a plurality of reaction videos that each indicate a reaction of a respective recipient to an image included in a message;
  presenting, in a message feed user interface, a thumbnail of the image that indicates that the plurality of reaction videos are available for presentation; and
  presenting, in response to user input selecting the thumbnail of the image, a message seen user interface that includes a plurality of different images, each of the plurality of different images associated with a respective one of the plurality of reaction videos.

13. The computer readable storage device of claim 12, wherein receiving the plurality of reaction videos that each indicate a reaction of a respective recipient to an image included in a message comprises receiving the plurality of reaction videos that each indicate a reaction of a different recipient to a particular image included in a message, each of the particular images being the same.

14. The computer readable storage device of claim 12, wherein receiving the plurality of reaction videos that each indicate a reaction of a respective recipient to an image included in a message comprises receiving the plurality of reaction videos that each indicate a reaction of a particular recipient to a different image included in a message.

15. The computer readable storage device of claim 14, the operations comprising:
  determining, for each of the different images, a rank for the respective image compared to the other images using a parameter of the respective reaction video that indicates a reaction of the particular recipient to the respective image.

16. The computer readable storage device of claim 12, the operations comprising:
  analyzing, for each of the plurality of reaction videos, a parameter of the respective reaction video; and
  determining, for each of the plurality of reaction videos, a rank for the respective reaction video compared to the other reaction videos using the parameter of the respective reaction video.

17. The computer readable storage device of claim 16, wherein:
  analyzing, for each of the plurality of reaction videos, the parameter of the respective reaction video comprises determining, for each of the plurality of reaction videos, a largest smile size depicted in the respective reaction video; and
  determining, for each of the plurality of reaction videos, the rank for the respective reaction video compared to the other reaction videos using the parameter of the respective reaction video comprises determining, for each of the plurality of reaction videos, the rank for the respective reaction video using the largest smile size depicted in the respective reaction video.

18. The computer readable storage device of claim 17, the operations comprising:
  determining an average smile size using the largest smile sizes depicted in each of the reaction videos; and
  determining, for the image to which each of the plurality of reaction videos indicate a reaction of a respective recipient, a rank of the image compared to other images using the average smile size.

19. The computer readable storage device of claim 16, wherein:
  analyzing, for each of the plurality of reaction videos, the parameter of the respective reaction video comprises determining, for each of the plurality of reaction videos, a duration of the respective reaction video; and
  determining, for each of the plurality of reaction videos, the rank for the respective reaction video compared to the other reaction videos using the parameter of the respective reaction video comprises determining, for each of the plurality of reaction videos, the rank for the respective reaction video using the duration of the respective reaction video.

20. The computer readable storage device of claim 16, wherein:
  analyzing, for each of the plurality of reaction videos, the parameter of the respective reaction video comprises determining, for each of the plurality of reaction videos, a duration of time for which a face depicted in the respective reaction video is directed toward a presentation of the image; and
  determining, for each of the plurality of reaction videos, the rank for the respective reaction video compared to the other reaction videos using the parameter of the respective reaction video comprises determining, for each of the plurality of reaction videos, the rank for the respective reaction video using the duration of time for which a face depicted in the respective reaction video is directed toward a presentation of the image.

21. The computer readable storage device of claim 16, wherein:
  analyzing, for each of the plurality of reaction videos, the parameter of the respective reaction video comprises determining, for each of the plurality of reaction videos, a laughter rating using frames in the respective reaction video that each depict the corresponding recipient laughing; and
  determining, for each of the plurality of reaction videos, the rank for the respective reaction video compared to the other reaction videos using the parameter of the respective reaction video comprises determining, for each of the plurality of reaction videos, the rank for the respective reaction video using the laughter rating.

22. A non-transitory computer readable storage device storing a computer program product comprising machine-readable instructions that, when executed, cause a computer system to carry out operations comprising:

receiving, from a device, an electronic message that includes an image;

presenting, in a message feed user interface prior to presenting the image in a user interface, an icon representing a type of the image that indicates the image is available for presentation without indicating specific content depicted in the image;

presenting, on a display and in the user interface, a placeholder for the image in response to receipt of user input indicating selection of the icon representing the type of the image in the message feed user interface;

receiving user input indicating selection of a menu option that requests removal of the placeholder and presentation of the image in the user interface;

removing the placeholder from the user interface and presenting the image in the user interface in response to receiving the user input indicating selection of the menu option that requests removal of the placeholder and presentation of the image in the user interface;

while presenting the image in the user interface, causing storage of a reaction video in a memory;

presenting, in the message feed user interface after presenting the image in the user interface, a thumbnail of the image that indicates that content associated with the image is available for presentation upon selection of the thumbnail of the image;

receiving a plurality of second reaction videos that each indicate a reaction of a respective recipient to the image included in the electronic message;

presenting, in response to user input selecting the thumbnail of the image a message seen user interface that includes a plurality of different images, each of the plurality of different images associated with a respective one of the plurality of second reaction videos.

* * * * *

UNITED STATES PATENT AND TRADEMARK OFFICE
CERTIFICATE OF CORRECTION

PATENT NO. : 10,198,161 B2
APPLICATION NO. : 15/186156
DATED : February 5, 2019
INVENTOR(S) : Jonathan Collins, Jesse Collins and Michael Sitchenko Page 1 of 1

It is certified that error appears in the above-identified patent and that said Letters Patent is hereby corrected as shown below:

In the Claims

Column 24, Line 15, Claim 22, delete "image" and insert -- image, --, therefor.

Signed and Sealed this
Twenty-third Day of April, 2019

Andrei Iancu
*Director of the United States Patent and Trademark Office*